United States Patent [19]

Goulart

[11] Patent Number: 4,705,145
[45] Date of Patent: Nov. 10, 1987

[54] DISC BRAKES

[75] Inventor: Joseph F. Goulart, Union Lake, Mich.

[73] Assignee: Chrysler Motors Corporation, Highland Park, Mich.

[21] Appl. No.: 859,567

[22] Filed: May 5, 1986

[51] Int. Cl.⁴ .................. F16D 55/224; F16D 69/04
[52] U.S. Cl. ........................... 188/18 A; 188/73.31; 188/250 G
[58] Field of Search ............... 188/18 A, 71.1, 73.1, 188/73.32, 234, 250 B, 250 G

[56] References Cited

U.S. PATENT DOCUMENTS

| 3,042,152 | 7/1962 | Butler | 188/73.32 |
| 3,749,415 | 7/1973 | Sampatacos | 280/96.1 |
| 3,865,394 | 2/1975 | Epner | 280/96.1 |
| 3,940,159 | 2/1976 | Pringle | 188/18 A X |
| 3,941,221 | 3/1976 | Pringle | 188/218 |
| 4,313,527 | 2/1982 | Pickel | 188/73.1 X |
| 4,433,757 | 2/1984 | Warwick et al. | 188/73.32 X |
| 4,596,317 | 6/1986 | Nagai et al. | 188/250 G X |

Primary Examiner—Duane A. Reger
Attorney, Agent, or Firm—Edward A. Craig

[57] ABSTRACT

A disc brake is provided which comprises a self-contained wheel bearing including a casing with an axle structure extending into the casing and a bearing structure within the casing rotatably supporting the casing on the axle structure. The casing is connected to a wheel and forms the wheel hub. The axle structure is connected to a steering knuckle which has brake cylinder structure thereon. A brake plate having brake piston structure operatively engages the brake cylinder structure. Brake pads are provided in operative relationship to a brake disc which is slidably mounted on the bearing casing.

4 Claims, 5 Drawing Figures

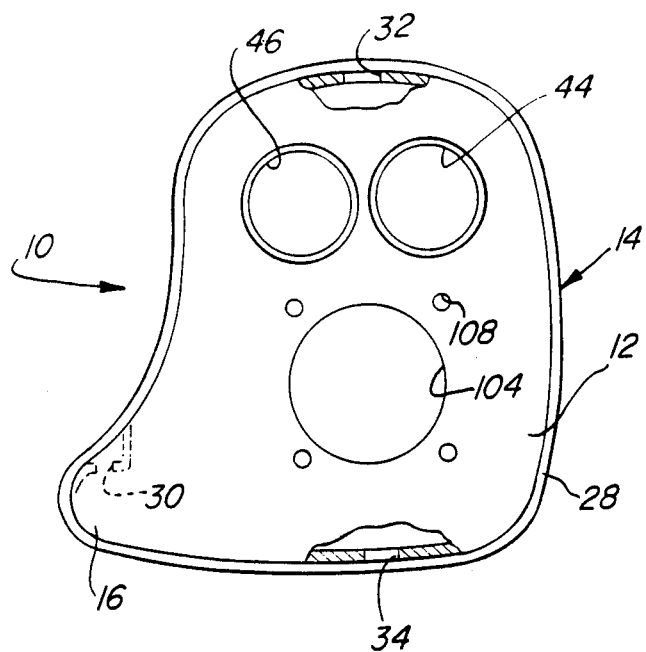
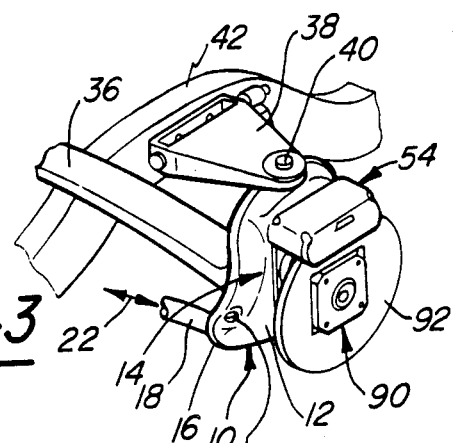
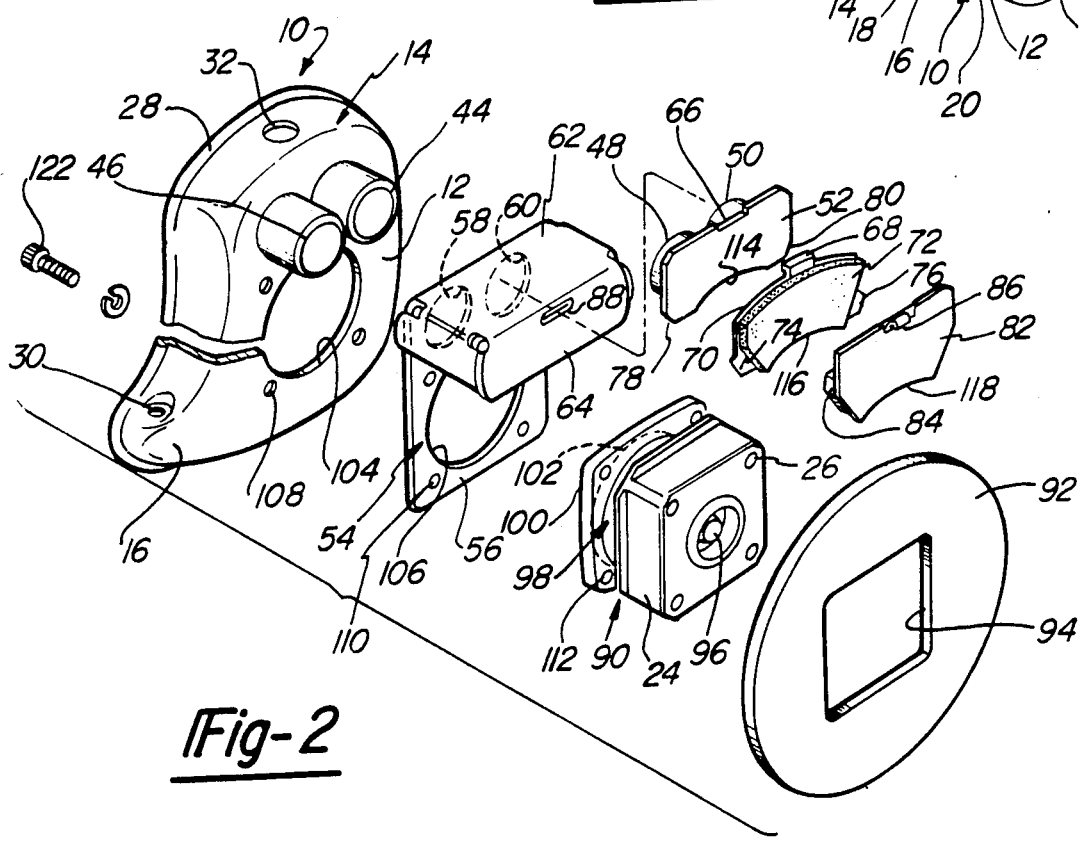

DISC BRAKES

RELATED APPLICATION

This application is related to my copending application entitled "Steering Knuckle", Ser. No. 848,020 filed Apr. 3, 1986.

BACKGROUND OF THE INVENTION

1. Field of the Invention

This invention relates to a disc brake for vehicles which incorporates into the structure thereof the vehicle steering knuckle and wheel bearing.

2. Prior Art

Vehicle disc brakes have, in the past, been provided as a separate component with respect to the steering knuckle and wheel bearing. However, disc brakes are closely associated with both the steering knuckle and wheel bearing and it would be desirable from the design and manufacturing viewpoint to functionally integrate these three components so that in effect, both the steering knuckle and wheel bearing would serve double duty. Such a construction would not only reduce the number of elements necessary for the overall construction but would also reduce the number of steps necessary to assemble the componentry.

U.S. Pat. No. 3,941,221, Pringle, Mar. 2, 1976 illustrates an attempt in this direction. However, Pringle does not integrate the bearing and steering knuckle into an arrangement wherein these components form an operative part of the disc brake as well as the usual functions, nor does he provide a bearing construction which is self contained and which may also be utilized as a wheel hub as in the present invention.

It is also desirable in such a construction to utilize a steering knuckle which is fabricated from sheet metal as opposed to the conventional casting or forging processes. Pringle does illustrate a pressed metal steering knuckle. Similar steering knuckles are illustrated in Epner et al, U.S. Pat. No. 3,865,394, Feb. 11, 1975 and Sampatacos, U.S. Pat. No. 3,749,415, July 31, 1973. However, the sheet metal knuckle of the present invention incorporates brake cylinder structure as a fixed part thereof which permits utilization in the brake structure without the separate provision of cylinder means. Additionally, a separate steering arm does not have to be provided, the steering arm being integral with the knuckle. Epner et al does illustrate such an integral steering arm. However, he must crimp the steering arm which involves a separate operation. The steering arm of the knuckle of the present invention is not crimped, a steering rod being used to provide structural rigidity therefor.

The disc brake of the present invention employs a self-contained bearing having a casing with an angular outer periphery which mates with an angular opening provided in the brake disc, with the disc being slidably received on the bearing casing. A similar disc and hub construction is illustrated in Strain et al, U.S. Pat. No. 3,233,704, Feb. 8, 1966. However, the Strain et al construction is not otherwise similar. The present arrangement permits disc movement on the hub for wear adjustment. Similar disc movement is provided for in the Pringle patent. However, such an arrangement is not incorporated into a cooperative relationship with the wheel bearing casing.

SUMMARY OF THE INVENTION

The disc brake comprises a self-contained wheel bearing including a casing. Axle structure extends into the casing. Bearing structure is provided within the casing to rotatably support the casing on the axle structure. Means are provided for connecting the casing to a wheel. The axle structure is connected to a steering knuckle. Brake cylinder structure extends outwardly from the steering knuckle. A brake plate is provided having brake piston structure operatively engaging the brake cylinder structure. Brake pad support means are provided including a plate member having brake cylinder opening means with the brake cylinder structure passing therethrough. A bridge member extends from the brake pad support means plate member and away from the steering knuckle. A bent-over portion extends from the brake portion. The bent-over portion has brake pad structure opening means therein. A brake pad structure is provided having hook means which are received in the brake pad structure opening means to connect the brake pad structure to the brake pad support means. The brake plate has a notch in one edge thereof. Another brake pad structure is provided having hook means which are received in the notch to connect the brake pad structure to the brake plate. The bearing casing has an angular peripheral outer configuration. A brake disc is provided having a central opening with a mating angular peripheral configuration which is received on the bearing casing in non-rotatable but axially slidable relationship thereto.

Preferably, the brake cylinder structure comprises a pair of brake cylinders and the brake piston structure comprises a pair of brake pistons each of which is received in one of the brake cylinders.

The steering knuckle preferably comprises a unitary sheet metal, generally cup-shaped member having a bottom wall with a substantially continuous side wall structure extending outwardly therefrom. The side wall structure has means thereon for connecting the steering knuckle to control arm means to enable pivoting of the steering knuckle about an axis. The side wall structure and bottom coalesce at a point to form an integral outwardly extending steering arm for pivoting the steering knuckle about the axis. The brake cylinder structure extends outwardly from the bottom wall on the side thereof remote from side wall structure. The steering arm is generally cup-shaped and is defined by the bottom wall and side wall structure. The cup-shaped steering arm has a sufficient interior size to receive a steering rod element which also serves as structural reinforcement for the steering arm.

BRIEF DESCRIPTION OF THE DRAWINGS

FIG. 1 is a front elevational view forming one embodiment of the steering knuckle preferably used in the present invention;

FIG. 2 is a exploded view illustrating the steering knuckle of FIG. 1 in relationship to the associated brake structure;

FIG. 3 is a view in perspective of the steering knuckle and brake structure operatively assembled together;

BRIEF DESCRIPTION OF A PREFERRED EMBODIMENT

Figure 4:
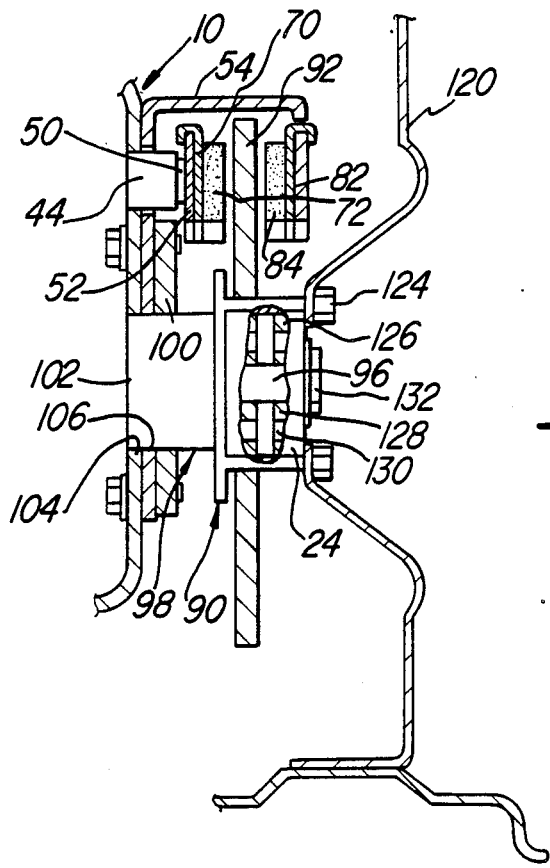
FIG. 4 is a sectional view of the assembled steering knuckle and brake structure connected to a wheel with the brake not being applied.

As will be noted in the figures, the steering knuckle 10 is a unitary sheet metal, generally cup-shaped member. The knuckle 10 has a bottom wall 12 from which extends a substantial continuous side wall structure 14. The side wall structure 14 extends outwardly from the bottom wall 12. The side wall structure 14 and bottom wall 12 coalesce at one point, as shown in FIG. 1 the lower left hand corner, to form an integral steering arm 16 for pivoting the steering knuckle.

The steering arm 16 is also generally cup-shaped and is defined by the bottom wall 12 and side wall structure 14. The cup-shaped steering arm 16 has a sufficient interior size to receive a steering rod element 18. The steering rod element 18 is retained in place by means of bolt structure 20 which permits pivoting thereof. As will be noted by the arrow 22, the steering rod element 18 is pushed in and out to cause pivoting of the steering knuckle 10 and consequent pivoting of a wheel mounted thereto. A wheel 120 is securable to a bearing casing 24 by means of threaded bolts 124 which are receivable in four threaded openings 26 which are provided in the face of the bearing casing 24.

In addition to providing the means for pivoting the steering knuckle 10, the steering rod element 18 also serves as structural reinforcement for the steering arm 16. This feature contributes to the ability to use sheet metal for the fabrication for the steering knuckle 10.

A flange 28 extends entirely around the periphery of the side wall structure 14. The flange 28 aids in giving the steering knuckle 10 structural rigidity.

The bolt structure 20 which secures the steering rod element 18 to the steering arm 16 extends through a recessed opening 30 provided in the steering arm 16. While referred to as a bolt structure, it will be appreciated that this element is not necessarily a separate element but may form part of a fixed portion of the steering rod element 18. Preferably, the structure is fixedly attached to the steering rod element 18 so that it may be not be separated in use. Additionally, an anti-roll bar (not shown) may be secured to the steering knuckle 10 in the area of the steering rod element 18.

As will be noted in FIG. 1, the steering knuckle 10 is provided with openings 32, 34 in the upper and lower portions of the side wall structure 14. A lower control arm 36, forming part of the suspension, is secured to the steering knuckle 10 by means of ball joint structure extending through the lower opening 34. An upper control arm 38 is secured to the upper portion of the steering knuckle 10 by means of ball joint structure 40 which extends through the upper opening 32. The upper control arm 38 is illustratively secured to chassis structure 42. The openings 32, 34 define a steering axis about which the steering knuckle 10 pivots.

Brake cylinder structure, comprising a pair of brake cylinders 44, 46, is carried on one face of the bottom wall 12 as by welding. The cylinders 44, 46 extend outwardly from the bottom wall 12 on the side of the bottom wall 12 remote from the side wall structure 14. The brake cylinders 44, 46 are adapted to operatively receive brake piston structure comprising pistons 48, 50 carried by a brake plate 52. A brake pad support means in the form of a brake bridge 54 comprising a plate 56 having a pair of openings 58, 60 is received on the brake cylinders 44, 46. The plate 56 has a forwardly bent portion 62 which extends away form the steering knuckle 10. A bent-over portion 64 extends from the portion 62. The brake plate 52 is received inside the structure defined by portions 62, 64.

A notch 66 is provided in the upper edge of the brake plate 52. The notch 66 receives a hook 68 provided on the upper edge of brake pad plate 70 to mount the brake pad plate 70 thereon. The brake pad plate 70 carries a brake pad 72. Inturned guide flanges 74, 76 are provided on the side edges of the brake pad plate 70. The guide flanges 74, 76 wrap around angled edge portions 78, 80 provided on the lower corners on the brake plate 52. A second outer brake pad plate 82 is provided. A brake pad 84 is provided on the inner surface of the brake pad plate 82. The plate 82 is provided with a hook 86 which is received in a slot 88 provided in the bent-over portion 64 of the brake bridge 54. The brake pad plate 82 is operatively hung from the brake bridge in operation of the brake structure.

The bearing casing 24 forms part of a self-contained wheel bearing 90. As will be noted, the bearing casing 24 has an angular peripheral outer configuration, being square in shape. A floating brake disc 92 has a mating central opening 94 which also has an angular peripheral configuration, also being square in shape and is received on the bearing casing 24 in non-rotative but axially slidable relationship thereto. The wheel bearing casing 24 contains internal bearing structure which provides support and permits rotation of the bearing casing 24 and associated wheel 120 on an axle stub 96 as shown in FIG. 4. The axle stub 96 is fixedly secured to a larger diameter fixed axle structure 98. A mounting plate 100 is fixedly secured to the axle structure 98 intermediate the ends thereof. A portion 102 of the axle structure 98 extends inwardly from the plate 100 as will be noted in dotted lines in FIG. 2.

The internal bearing structure comprises outer and inner races 126, 128 between which are provided roller bearings 130. A nut 132 is received on the end of the axle stub 96, which is externally threaded, to maintain the integrity of the bearing in conventional fashion.

The bottom wall 12 of the steering knuckle 10 is provided with an enlarged opening 104. A similar opening 106 is provided in the brake bridge plate 56. These openings receive the portion 102 of the axle structure when the various components are mounted together as shown in FIG. 3. The openings 104, 106 serve to center and align all of the various components. A plurality of bolt hole openings 108, 110, 112 are provided in each of the bottom wall 12 of the steering knuckle, brake bridge plate 56 and mounting plate 100 to permit insertion of bolt structures 122 to fixedly secure these components together when they are assembled as shown in FIG. 3. As will be noted, the bottom edges 114, 116, 118 of the brake plate 52, inner brake pad plate 70, outer brake pad plate 82 are arcuate to thereby fit over the fixed axle structure 98.

Figure 5:
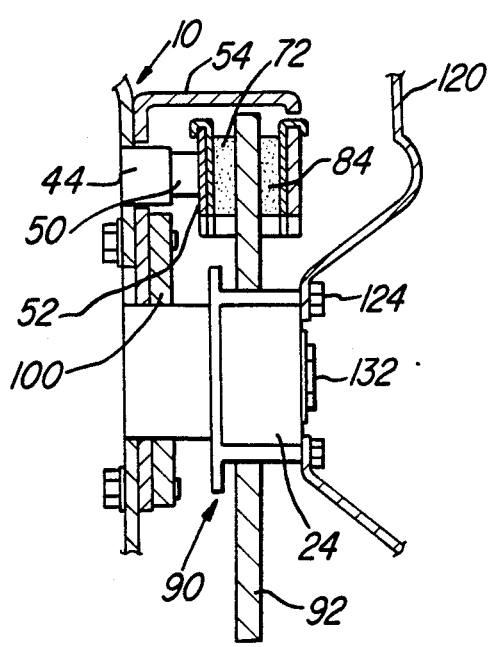
FIG. 5 is a view similar to FIG. 4 with the brake being applied.

When the components illustrated in FIG. 2 are assembled, the brake bridge 54 is first inserted over the brake cylinders 44, 46. The brake plate 52 is then mounted beneath the forwardly bent portion 62 with the pistons 48, 50 being inserted into the cylinders 44, 46. The inner brake pad plate 70 is then hooked onto the brake plate 52. The disc 92 is then mounted on the bearing casing 24. Finally, the outer brake pad plate 82 is mounted on the inner face of the bent-over portion 64 of the brake bridge so that all of the components are positioned beneath the forwardly bent portion 62. As will be appreciated, forcing of brake fluid under pressure through the brake cylinders 44, 46 will force the pistons 48, 50 outwardly from the position shown in FIG. 4 to the position shown in FIG. 5 thereby compressing the brake pads 72, 84 against the disc 92 and braking rotation of the bearing casing 24 and consequently the wheel 120 which is mounted thereon. The disc 92 is free to slide on bearing casing 24 to compensate for brake pad wear. The wheel 120 is mounted on wheel bearing 90 by means of the bolts 124 which are received in the threaded openings 26 provided in the bearing casing 24.

Having thus described my invention, I claim:

1. A disc brake comprising a self-contained wheel bearing including a casing, axle structure extending into the casing and bearing structure within the casing rotatably supporting the casing on the axle structure, means for connecting the casing to a wheel, a steering knuckle, the axle structure being connected to the steering knuckle, brake cylinder structure extending outwardly from the steering knuckle, a brake plate having brake piston structure operatively engaging the brake cylinder structure, a first brake pad structure, brake pad support means including a plate member having brake cylinder opening means, said brake cylinder structure passing through said brake cylinder opening means, a bridge member extending from the brake pad support means plate member and away from the steering knuckle, a bent-over portion extending from the bridge portion, said bent-over portion having brake pad structure opening means therein, a second brake pad structure having hook means received in said brake pad structure opening means to connect the second brake pad structure to the brake pad support means, said brake plate having a notch in one edge thereof, said first brake pad structure having hook means received in said notch to connect the first brake pad structure to the brake plate, the bearing casing having an angular peripheral outer configuration, a brake disc having a central opening with a mating angular peripheral configuration received on the bearing casing in non-rotatable but axially slidable relationship thereto.

2. A disc brake as defined in claim 1, further characterized in that said brake cylinder structure comprises a pair of brake cylinders and said brake piston structure comprises a pair of brake pistons each received in one of said brake cylinders.

3. A disc brake as defined in claim 1, further characterized in that the steering knuckle comprises a unitary sheet metal, generally cup-shaped member having a bottom wall, substantially continuous side wall structure extending outwardly from the bottom wall, the side wall structure having means thereon for connecting the steering knuckle to control arm means to enable pivoting of the steering knuckle about an axis, the side wall structure and bottom coalescing at a point to form an integral outwardly extending steering arm for pivoting the steering knuckle about said axis, said brake cylinder structure extending outwardly from the bottom wall on the side thereof remote from the sidewall structure.

4. Structure as defined in claim 2, further characterized in that the steering arm is generally cup-shaped and defined by the bottom wall and side wall structure, the cup-shaped steering arm having a sufficient interior size to receive a steering rod element which also serves as structural reinforcement for the steering arm.

* * * * *